(12) United States Patent
Iqbal

(10) Patent No.: US 11,941,028 B2
(45) Date of Patent: Mar. 26, 2024

(54) EFFICIENT PROCESS FOR CREATING RANGE-PARTITIONED INDEXES ENSURING UNIFORM DOCUMENT DISTRIBUTION

(71) Applicant: Box, Inc., Redwood City, CA (US)

(72) Inventor: Nawab Zada Asad Iqbal, Union City, CA (US)

(73) Assignee: Box, Inc., Redwood City, CA (US)

( * ) Notice: Subject to any disclaimer, the term of this patent is extended or adjusted under 35 U.S.C. 154(b) by 44 days.

(21) Appl. No.: 16/244,289

(22) Filed: Jan. 10, 2019

(65) Prior Publication Data

US 2020/0226149 A1    Jul. 16, 2020

(51) Int. Cl.
*G06F 16/27*  (2019.01)
*G06F 16/22*  (2019.01)

(52) U.S. Cl.
CPC ........ *G06F 16/278* (2019.01); *G06F 16/2272* (2019.01); *G06F 16/2282* (2019.01)

(58) Field of Classification Search
CPC . G06F 16/278; G06F 16/2272; G06F 16/2282
USPC ........................................................ 707/802
See application file for complete search history.

(56) References Cited

U.S. PATENT DOCUMENTS

| 4,575,798 | A  | * | 3/1986  | Lindstrom | G06F 7/24   |
| 10,356,150 | B1 | * | 7/2019  | Meyers    | H04L 65/70  |
| 2003/0055822 | A1 | * | 3/2003  | Yu        | G06F 16/278 |
| 2007/0282798 | A1 | * | 12/2007 | Akilov    | G06F 16/284 |
| 2013/0212122 | A1 | * | 8/2013  | Tootill   | G06F 16/20  |
|           |    |   |         |           | 707/769     |
| 2015/0134626 | A1 | * | 5/2015  | Theimer   | G06F 11/3055 |
|           |    |   |         |           | 707/693     |

* cited by examiner

*Primary Examiner* — Sherief Badawi
*Assistant Examiner* — Earl Elias
(74) *Attorney, Agent, or Firm* — Sheridan Ross P.C.

(57) ABSTRACT

Embodiments are directed to distributing records among storage partitions by maintaining a table of records. The table of records can be indexed based on an original partitioning key in the table of records. A plurality of counters can be initialized with each counter associated with a sub-range in a total range of key values for a secondary index partitioning key. Each record of the table of records can be read and a count of records in the associated sub-range can be accumulated in each counter. The number of records per partition can be determined based on the total number of records in the total range of key values and the number of available partitions and the records can be distributed to the available partitions in the storage system based on the number of records in each sub-range.

15 Claims, 7 Drawing Sheets

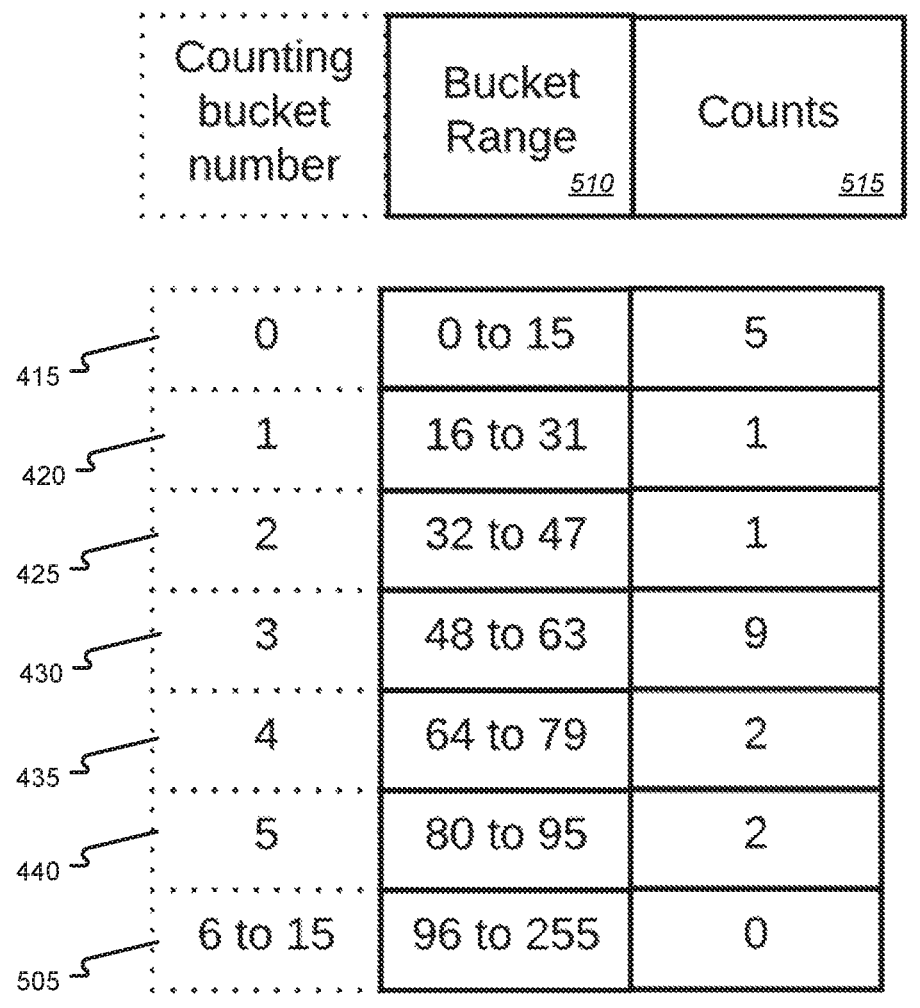

| Counting bucket number | Bucket Range 510 | Counts 515 |
|---|---|---|
| 0 | 0 to 15 | 5 |
| 1 | 16 to 31 | 1 |
| 2 | 32 to 47 | 1 |
| 3 | 48 to 63 | 9 |
| 4 | 64 to 79 | 2 |
| 5 | 80 to 95 | 2 |
| 6 to 15 | 96 to 255 | 0 |

*FIG. 5*

| Partition Number | Calculated Range 625 | Actual Count 630 |
|---|---|---|
| 0 | <16 | 5 |
| 1 | <53 | 3 |
| 2 | <62 | 7 |
| 3 | <=255 | 5 |

*FIG. 6*

EFFICIENT PROCESS FOR CREATING RANGE-PARTITIONED INDEXES ENSURING UNIFORM DOCUMENT DISTRIBUTION

FIELD OF THE DISCLOSURE

Embodiments of the present disclosure relate generally to methods and systems for distribution of data across storage devices and more particularly to distributing records among storage partitions based on range-partitioned indexes.

BACKGROUND

In big data systems, where data is distributed across many machines, uniform distribution and colocation (e.g. on same partition or host) of "similar" data is usually preferred. Uniform distribution of data by itself is not hard to achieve. For example, one way is to distribute incoming documents in a round-robin fashion to all the machines. However uniform distribution is a challenge when also ensuring that related data is indexed together. A common example is a multi-tenant Software as a Service (SaaS) system, where data belonging to the same customer of the service may need to be stored together for various reasons.

In the absence of any data distribution guidance, many databases and search indexes will grow a partition of data (region in Hbase, shard in Solr, etc.) until it hits some specified limit and then split it into smaller partitions. Without any external intervention, this can result in varying sizes of partitions. At read time, the uneven data distribution across the machines, will impact full table scans as the data on larger partitions will take longer to finish. Similarly, concurrent point queries will cause hot spots on the larger partitions. Creating a secondary index without applying data distribution knowledge significantly degrades write performance during the initial creation of the index since there will be large skews in data distribution requiring partition splits and moving partitions across the network. Hence, there is a need for improved methods and systems for distributing data across storage devices.

BRIEF SUMMARY

Embodiments of the disclosure provide systems and methods for distributing records among storage partitions based on range-partitioned indexes. According to one embodiment, a method for distributing records among storage partitions based on range-partitioned indexes can comprise maintaining, by a storage system, a table of records stored by the storage system. The table of records can be indexed based on an original partitioning key in the table of records. The first partition key can comprise an identifier uniquely identifying each record.

A partitioning function executed by the storage system can initialize a plurality of counters. Each counter of the plurality of counters can be associated with a sub-range of a plurality of sub-ranges in a total range of key values for a secondary index partitioning key. Initializing the plurality of counters can comprise determining a number of counters in the plurality of counters by determining the distribution of the secondary index partitioning key after scanning the table of records. The partitioning function executed by the storage system can read each record of the table of records and accumulate, in each counter of the plurality of counters, a count of a number of records in the associated sub-range based on the records of the table of records and the one or more records associated with each secondary index partitioning key. Accumulating the count of the number of records in the associated sub-range can be performed in parallel processes and a total number of records in the total range of key values for the secondary index partitioning key can comprise a sum of the number of records in each sub-range.

The partitioning function executed by the storage system can determine a number of records per partition based on a total number of records in the total range of key values for the secondary index partitioning key and a number of available partitions in the storage system. The partitioning function executed by the storage system can then distribute the records stored by the storage system to the available partitions in the storage system based on the number of records in each sub-range. For example, distributing the records stored by the storage system to the available partitions in the storage system based on the number of records in each sub-range can comprise arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target record count for each partition.

According to another embodiment, a system can comprise one or more storage devices, a processor, and a memory coupled with and readable by the processor. The memory can store therein a set of instructions which, when executed by the processor, causes the processor to distribute records among storage partitions in the one or more storage devices based on range-partitioned indexes by maintaining a table of records. The table of records can be indexed based on an original partitioning key in the table of records.

The instructions can further cause the processor to initialize a plurality of counters. Each counter of the plurality of counters can be associated with a sub-range of a plurality of sub-ranges in a total range of key values for a secondary index partitioning key. Initializing the plurality of counters can comprise determining a number of counters in the plurality of counters by determining the distribution of the secondary index partitioning key after scanning the table of records. The instructions can further cause the processor to read each record of the table of records and accumulate, in each counter of the plurality of counters, a count of a number of records in the associated sub-range based on the records of the table of records and the one or more records associated with each secondary index partitioning key. Accumulating the count of the number of records in the associated sub-range can be performed in parallel processes and a total number of records in the total range of key values for the secondary index partitioning key can comprise a sum of the number of records in each sub-range.

The instructions can further cause the processor to determine a number of records per partition based on a total number of records in the total range of key values for the secondary index partitioning key and a number of available partitions in the storage system. The instructions can then cause the processor to distribute the records stored by the storage system to the available partitions in the storage system based on the number of records in each sub-range. For example, distributing the records stored by the storage system to the available partitions in the storage system based on the number of records in each sub-range can comprise arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target record count for each partition.

According to another embodiment, a non-transitory, computer-readable memory can comprise a set of instructions stored therein which, when executed by a processor, causes the processor to distribute records among storage partitions in the one or more storage devices based on range-partitioned indexes by maintaining a table of records. The first partition key can comprise an identifier uniquely identifying each record.

The instructions can further cause the processor to initialize a plurality of counters. Each counter of the plurality of counters can be associated with a sub-range of a plurality of sub-ranges in a total range of key values for the secondary index partitioning key. Initializing the plurality of counters can comprise determining a number of counters in the plurality of counters by determining the distribution of the secondary index partitioning key after scanning the table of records. The instructions can further cause the processor to read each record of the table of records and accumulate, in each counter of the plurality of counters, a count of a number of records in the associated sub-range based on the records of the table of records and the one or more records associated with each secondary index partitioning key. Accumulating the count of the number of records in the associated sub-range can be performed in parallel processes and a total number of records in the total range of key values for the secondary index partitioning key can comprise a sum of the number of records in each sub-range.

The instructions can further cause the processor to determine a number of records per partition based on a total number of records in the total range of key values for the secondary index partitioning key and a number of available partitions in the storage system. The instructions can then cause the processor to distribute the records stored by the storage system to the available partitions in the storage system based on the number of records in each sub-range. For example, distributing the records stored by the storage system to the available partitions in the storage system based on the number of records in each sub-range can comprise arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target record count for each partition.

BRIEF DESCRIPTION OF THE DRAWINGS

FIG. 5 is a is a block diagram illustrating an example of determining a number of records per partition according to one embodiment of the present disclosure.

FIG. 6 is a is a block diagram illustrating an example of distributing records to partitions according to one embodiment of the present disclosure.

Figure 1:
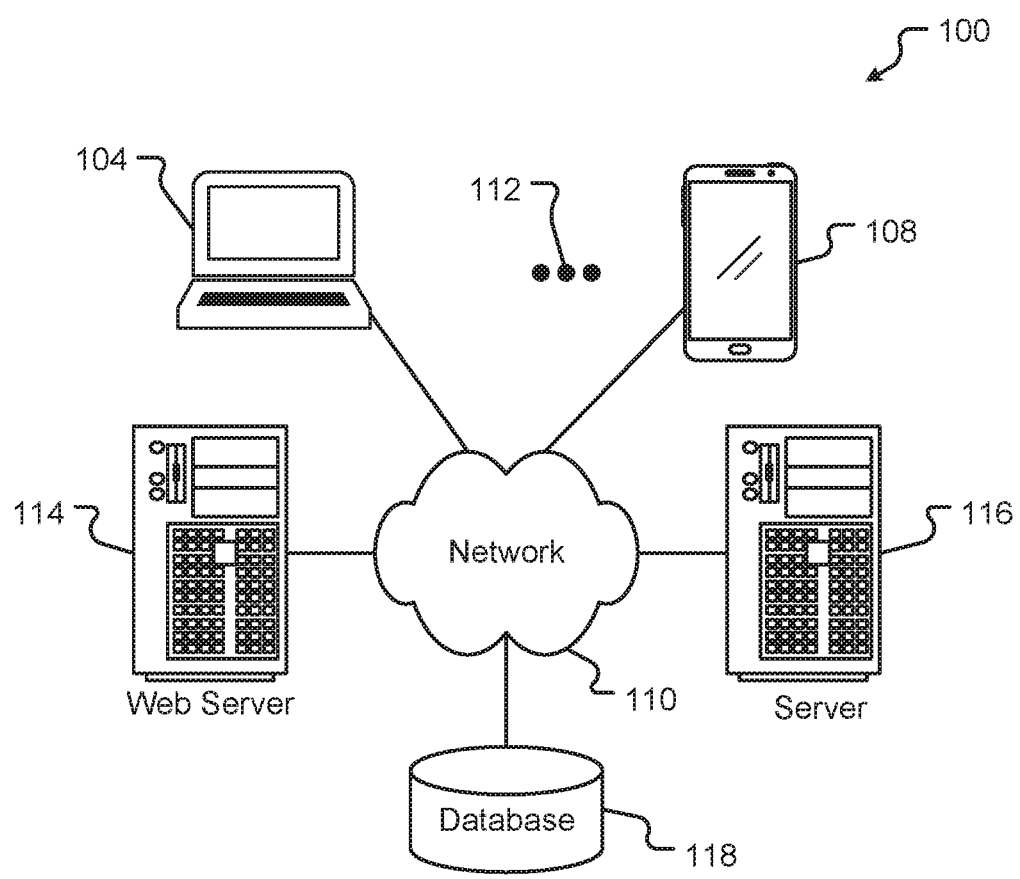
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
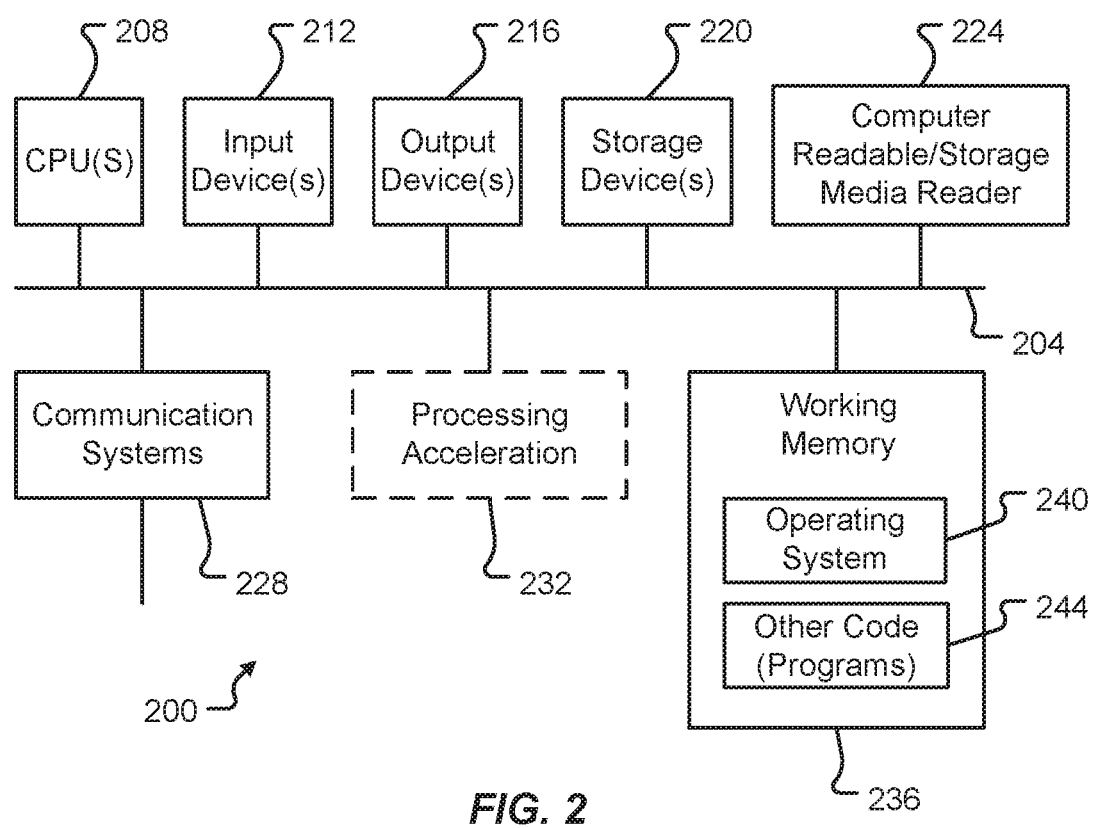
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
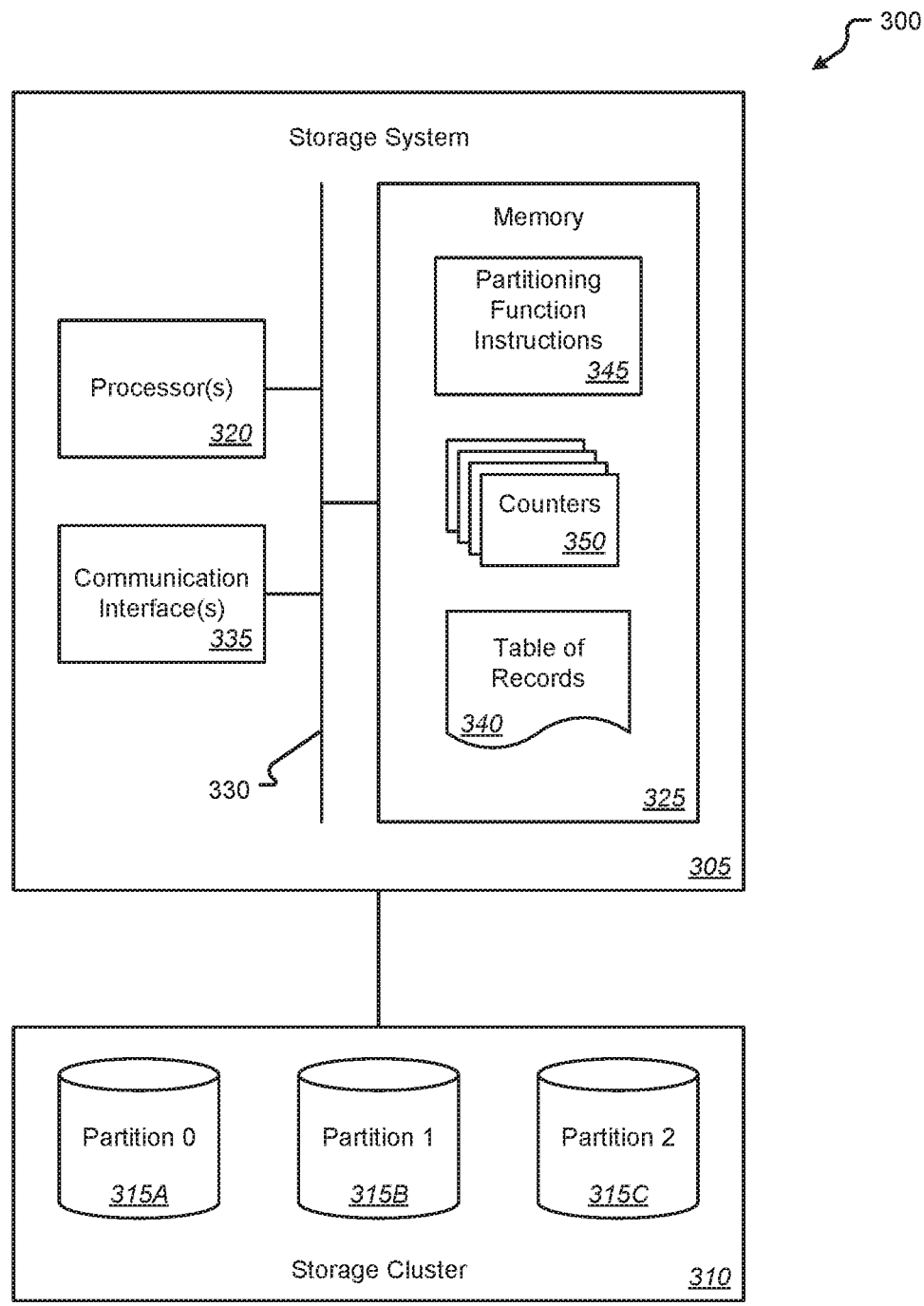
FIG. 3 is a block diagram illustrating elements of an exemplary system in which distributing records among storage partitions based on range-partitioned indexes can be performed according to one embodiment of the present disclosure.

FIG. 3 is a block diagram illustrating elements of an exemplary system in which distributing records among storage partitions based on range-partitioned indexes can be performed according to one embodiment of the present disclosure. As illustrated in this example, the system 300 can comprise a storage system 305 such as any of the servers or other computing systems described above. The storage system 305 can be communicatively coupled with a storage cluster 310 via one or more communications networks (not shown here) such as any of the local area or wide area networks described above. The storage cluster 310 can comprise any number of storage devices as known in the art and which can be organized into any number of partitions 315A-315C also as known in the art.

The storage system can comprise a processor 320 such as any of the various types of processors described above. A memory 325 can be coupled with and readable by the processor 320 via a communications bus 330. The memory 325 can comprises any one or more of the different types of volatile and/or non-volatile memories described above. The processor 320 can also be coupled with one or more communication interfaces 335 via the communications bus 330. The communication interfaces 335 can comprise any of a variety of wired or wireless communications interfaces for connecting the storage system 305 to a communications network as described above and as known in the art.

The memory 305 can store therein sets of instructions which, when executed by the processor 320, cause the processor 320 distribute records among the partitions 315A-315C in the storage devices of the storage cluster 310. The memory 325 can also have stored therein a table of records 340. The table of records 340 can be indexed based on an original partitioning key in the table of records. For example, this first partition key can comprise an identifier uniquely identifying each record.

The memory can also comprise a set of partitioning function instructions 345 stored there. When executed by the processor 320, the partitioning function instructions 345 can cause the processor 320 to initialize a plurality of counters 350. Each counter of the plurality of counters 350 can be associated with a sub-range of a plurality of sub-ranges in a total range of key values for a secondary index partitioning key for the table of records 340. Initializing the plurality of counters can comprise determining a number of counters in the plurality of counters by determining the distribution of the secondary index partitioning key after scanning the table of records. The secondary index partition key can comprise, for example, an identifier uniquely identifying some association between two or more records. For example, in a multi-tenant storage situation in which two or more corporation may be subscribers or tenants, the primary or original index partitioning key may be the user ID associated with each record and the secondary index partitioning key may be an employer ID for each record, i.e., the employer, corporation, or other entity associated with the user.

The partitioning function instructions 345 can further cause the processor 320 to read each record of the table of records 340 and accumulate, in each counter of the plurality of counters 350, a count of a number of records in the associated sub-range based on the records of the table of records 340 and the one or more records associated with each secondary index partitioning key. Accumulating the count of the number of records in the associated sub-range can be performed by the processor 320 in parallel processes and a total number of records in the total range of key values for the secondary index partitioning key can comprise a sum of the number of records in each sub-range.

The partitioning function instructions 345 can further cause the processor 320 to determine a number of records per partition 315A-315C based on a total number of records in the total range of key values for the secondary index partitioning key and a number of available partitions in the storage cluster 310. The partitioning function instructions 345 can then cause the processor 320 to distribute the records stored by the storage system to the available partitions 315A-315C in the storage cluster 310 based on the number of records in each sub-range. For example, distributing the records to the available partitions 315A-315C in the storage cluster 310 can comprise arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target record count for each partition.

Figure 4:
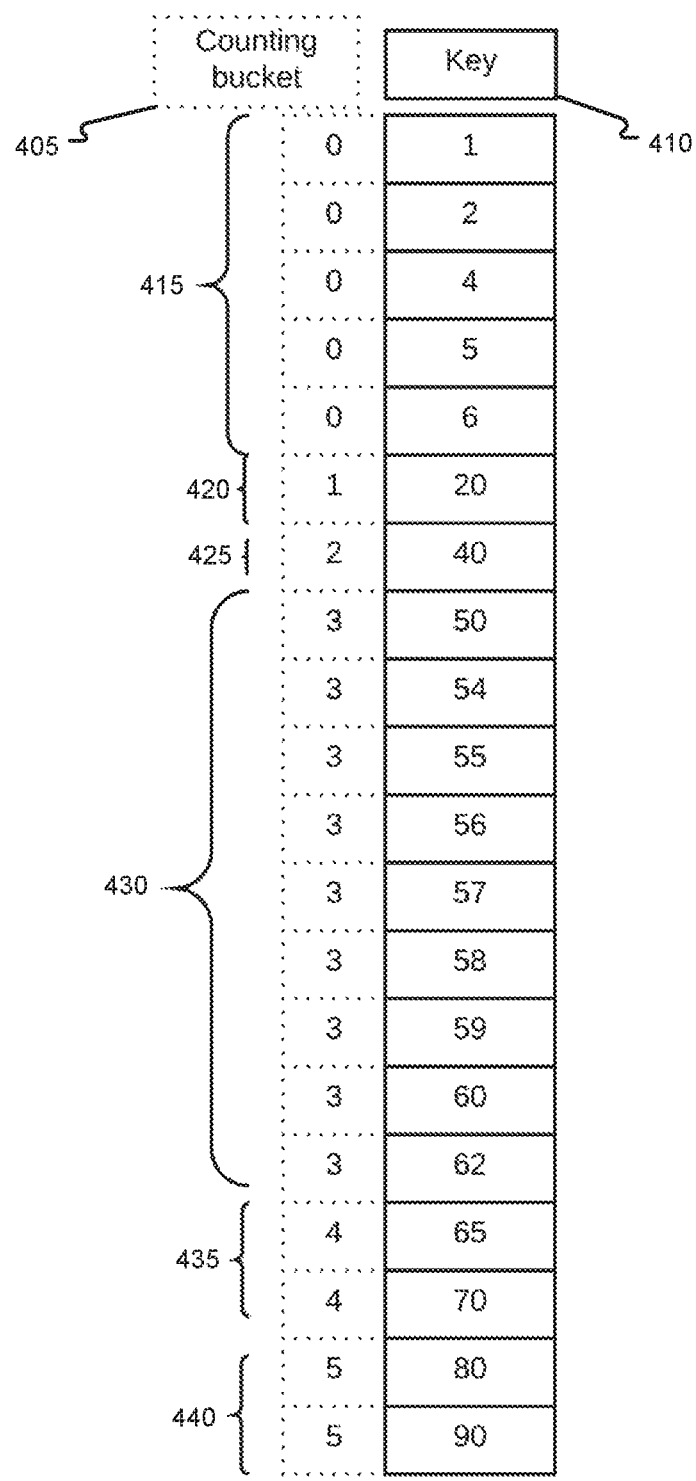
FIG. 4 is a is a block diagram illustrating an example of accumulating a record count according to one embodiment of the present disclosure.

To further illustrate the distribution of records as performed by the processor 320 when executing the partitioning function instructions 345, an example is provided here with reference to FIGS. 4-6. This example will be described based on a table of records 340 partitioned by user ID, i.e., having an original partitioning key in the table of records equal to a user ID for each user. In this example, a secondary index partitioning key can be created to index this data on the employer ID for each user. This means that in this new organization, records associated with employees of the same employer will be co-located. The table of records 340 can then be analyzed to gather statistics on the secondary index partitioning key (employer ID) by reading all the records in the table. In some cases, this read can be done in multiple parallel threads. However, it should be noted and understood that use of the user ID as the original partitioning key and the employer ID as the secondary index partitioning key is described here by way of example and not limitation and that any of a variety of other keys can be used in different implementations.

As described above, a number of counters can be maintained during the scan. If the distribution of the partitioning key is known, then the number of counters can be chosen accordingly. For example, for English alphabet-based values, powers of 26 can be used. For decimal values, powers of 10 can be used. If the partitioning key can use all values in the binary range, then powers of 2 can be used. Yet, another option is to use the partitioning key as the counter key and store the number of occurrences as the value for each instance of the partitioning key. In this case, a tree-like structure (e.g. Java's TreeMap) can be used with the tree's keys being instances of partitioning-key and values being the number of occurrences for that key value. The tree can also provide an efficient way of traversing the counters in sorted order of keys.

If the distribution of partitioning is not known, then instead of the partitioning key, the first n bits of the hash of the partitioning key can be used and binary data can be assumed. This can help with better data distribution. However, it doesn't solve the whole problem as some values of secondary index partitioning key may have a large number of records associated with them causing skew. One side-effect of this approach is that, taking hash of the partitioning key will randomize the sort order between different partitioning keys. The records associated with each secondary index partitioning key will still be co-located.

In the example represented by FIGS. 4-6, a binary range for keys is assumed and an n-bit counter is used, where n is 4 bit. This assumes total length of secondary index partitioning key is 8 bits. The scan of the table of records 340 can analyze the first 4 bits of the key for reach record, so there are $2^n$ possibilities. Hence, the number of counters can be $c=2^n=16$. This number should be much larger than the number of desired partitions. A relatively higher value of 'c' will help in decreasing the skew in distribution of data across partitions. For this example, we desire to make 4 partitions of the data.

FIG. 4 is a block diagram illustrating an example of accumulating a record count and FIG. 5 is a block diagram illustrating an example of determining a number of records per partition based on the accumulated counts per counter. As illustrated in this example, a set 405 of count buckets or equal length sub-ranges 415-440 of key values can be calculated for the set of all values in the secondary index partitioning key 410. For each record, the first n bits of the secondary index partitioning key can be used to identify the appropriate count buckets or sub-ranges 415-440 and counter's value for that count buckets or sub-ranges 415-440 will be increased by one for each occurrence. This example assumes 20 documents as represented by the key value column 410. For the purpose of this example the key is the partitioning key and the sub-ranges 415-440 are defined by ranges of the key value. In another example, using an alphabetic secondary index partitioning key and taking a counter length of one character, there will be 26 equal length counters. As used here the term equal length counter means that each counter will count the records starting with exactly one character. So, in this example there would be a counter for keys starting with "a," a counter for keys starting with "b," a counter for keys starting with "c," and so on up to a counter for keys starting with "z."

FIG. 5 represents each sub-range 415-440 (with some ranges 505 having a zero count), the range of key values 510 for each sub-range, and the accumulated count 515 for each subrange based on the example of FIG. 4. As illustrated by the sum of the counts 515, the total documents count is 20. The records per partition can then be determined. In this example, with total 20 documents and assuming 4 partitions, the desired record count per partition is 5.

After getting the counts for each sub-range, the counts can be scanned in sorted order and the adjacent counting buckets or sub-ranges can be combined to a partition unless the sum of counts exceeds the desired document count in each partition. FIG. 6 is a block diagram illustrating an example of distributing records to partitions in this way. More specifically, this example represents the partition number 605-620 for each partition, the range 625 of key values assigned to that partition, and the count 630 of records in that range.

In this example, sub-range 0 415 is assigned to partition 0 605 and since it meets the partition capacity of five as determined above, the range for partition 0 605 is the range of key values for sub-range 0 415, i.e., keys with prefix in [0,15]. For partition 1 610, five values should be assigned. Sub-range 1 420 has only one value so sub-range 2 425 can also be added to this partition's 610 range. There is still room in this partition 610 for 3 more documents. However, sub-range 3 430 has a count of 9. This sub-range 430 can be split between partitions.

In such scenarios, a scan of the documents within the sub-range can be made to find exact boundary. In most cases, this is not efficient as it usually requires the data to be previously partitioned on the partitioning key. According to one embodiment, the following heuristic can be applied. The length of sub-range can be multiplied by the share of that sub-range. The length of each sub-range is the number of possible unique instances of partitioning key in that sub-range. In this case, that happens to be 16 calculated as $2^{total\ key\ length - keys\ used\ for\ the\ counter}$ and the share of the sub-range can be estimated as the number of values used from the sub-range divided by the total count in the sub-range, e.g., =3/9=1/3. Accordingly, and as illustrated in FIG. 6, the limit of Partition 1 in sub-range 3=>16*1/3=>5.33. The range for partition 1 can be defined as [16 to 31]+[32 to 47]+[48+5.33]=>[16 to 53]. The range for Partition 2 will start from 54 and also end within sub-range 3:430. For calculating the fraction, the upper limit for Partition 2 can be marked at the 8th entry in sub-range 2 since 3 entries are already assigned to Partition 1 and 5 is the desired number of keys for each partition as defined above. Partition 2's upper limit can then be defined as =>16*8/9=>62 and partition 2's range can be [54, 62]. Partition 3's range can then be 63 to all the remaining range of keys, since this is the last partition.

Figure 7:
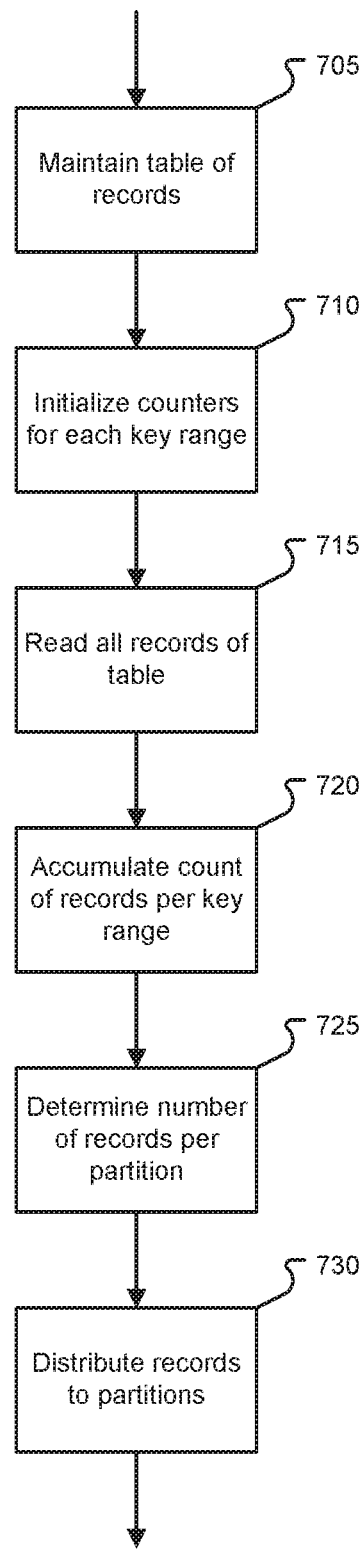
FIG. 7 is a flowchart illustrating an exemplary process for distributing records among storage partitions based on range-partitioned indexes according to one embodiment of the present disclosure.

FIG. 7 is a flowchart illustrating an exemplary process for distributing records among storage partitions based on range-partitioned indexes according to one embodiment of the present disclosure. As illustrated in this example, distributing records among storage partitions based on range-partitioned indexes can comprise maintaining 705, by the storage system, a table of records. The table of records can be indexed based on an original partitioning key in the table of records. The first partition key can comprise a record ID. A secondary index partition key can comprise a foreign key uniquely identifying some association between records.

A partitioning function executed by the storage system can initialize 710 a plurality of counters. Each counter of the plurality of counters can be associated with a sub-range of a plurality of sub-ranges in a total range of key values for the secondary index partitioning key. Initializing the plurality of counters can comprise determining a number of counters in the plurality of counters by determining the distribution of the secondary index partitioning key after scanning the table of records. The partitioning function executed by the storage system can read 715 each record of the table of records and accumulate 720, in each counter of the plurality of counters, a count of a number of records in the associated sub-range based on the records of the table of records and the one or more records associated with each secondary index partitioning key. Accumulating 720 the count of the number of records in the associated sub-range can be performed in parallel processes scanning disjoint subsets of the table of records and a total number of records for each sub-range of key values for the secondary index partitioning key can comprise the sum of the number of records in each sub-range across all disjoint subsets of the table of records, produced by the parallel processes.

The partitioning function can determine 725 which is desired number of records per partition based on a total number of records and a number of available partitions in the storage system. The partitioning function can then distribute 730 the records stored by the storage system to the available partitions in the storage system based on the number of records in each sub-range. For example, distributing 730 the records stored by the storage system to the available partitions in the storage system based on the number of records in each sub-range can comprise arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target record count for each partition.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for distributing records among storage partitions based on range-partitioned indexes, the method comprising:
   maintaining, by a storage system, a table of a plurality of records indexed based on a plurality of original partitioning keys in the table of records, wherein each original partitioning key comprises an identifier uniquely identifying a record of the plurality of records and an owner of the record, wherein the storage system comprises a multi-tenant storage system, wherein the records comprise records associated with a plurality of tenants, and wherein the owner of each record comprises one of a plurality of users associated with one of the plurality of tenants;
   initializing, by a partitioning function executed by the storage system, a plurality of counters, each counter of the plurality of counters associated with a sub-range of a plurality of equal-length sub-ranges in a total range of key values for a secondary index partitioning key, wherein the secondary index partition key comprises a foreign key uniquely identifying an association between owners of two or more records of the plurality of records, wherein the association between records uniquely identified by the secondary index partition key comprises an identification of the association between the owner of each record and one of the plurality of tenant, wherein a sub-range for each record is identified by a pre-determined number of first bits of the secondary index partition key and the number of sub-ranges is based on a range of values represented by the pre-determined number of first bits of the secondary index partition key;
   reading, by the partitioning function executed by the storage system, each record of the table of records;
   accumulating, by the partitioning function executed by the storage system, in each counter of the plurality of counters, a count of a number of records in the associated sub-range based on the pre-determined number of first bits of the secondary index partition key for each of the records of the table of records;
   determining, by the partitioning function executed by the storage system, a number of records per partition based on a total number of records in the total range of key values for the secondary index partitioning key and a number of available partitions in the storage system; and
   distributing, by the partitioning function executed by the storage system, the records stored by the storage system to the available partitions in the storage system based on the number of records in each sub-range while keeping records having a same secondary index partitioning key in a least number of partitions.

2. The method of claim 1, wherein initializing the plurality of counters comprises determining a number of counters in the plurality of counters by determining the distribution of the secondary index partitioning key after scanning the table of records.

3. The method of claim 1, wherein accumulating the count of the number of records in each sub-range is based on a number of occurrences of records associated with the secondary index partitioning key which matches that sub-range.

4. The method of claim 1, wherein accumulating, in each counter of the plurality of counters, the count of the number of records in the associated sub-range is performed in parallel processes and the total number of records in the total range of key values for the secondary index partitioning key comprises a sum of the number of records in each sub-range.

5. The method of claim 1, wherein distributing the records stored by the storage system to the available partitions in the storage system based on the number of records in each sub-range while keeping records having a same secondary index partitioning key in a least number of partitions comprises arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target record count for each partition.

6. A system comprising:
   one or more storage devices;
   a processor; and
   a memory coupled with and readable by the processor and storing therein a set of instructions which, when executed by the processor, causes the processor to distribute records among storage partitions in the one or more storage devices based on range-partitioned indexes by:
      maintaining a table of a plurality of records indexed based on a plurality of original partitioning keys in the table of records, wherein each original partitioning key comprises an identifier uniquely identifying a record of the plurality of records and an owner of the record, wherein the storage system comprises a multi-tenant storage system, wherein the records comprise records associated with a plurality of tenants, and wherein the owner of each record comprises one of a plurality of users associated with one of the plurality of tenants;
      initializing a plurality of counters, each counter of the plurality of counters associated with a sub-range of a plurality of sub-ranges in a total range of key values for a secondary index partitioning key, wherein the secondary index partition key comprises a foreign key uniquely identifying an association between owners of two or more records of the plurality of records, wherein the association between records uniquely identified by the secondary index partition key comprises an identification of the association between the owner of each record and one of the plurality of tenant, and wherein a sub-range for each record is identified by a pre-determined number of first bits of the secondary index partition key and the number of sub-ranges is based on a range of values represented by the pre-determined number of first bits of the secondary index partition key;

reading each record of the table of records;

accumulating in each counter of the plurality of counters, a count of a number of records in the associated sub-range based on the pre-determined number of first bits of the secondary index partition key for each of the records of the table of records;

determining a number of records per partition based on a total number of records in the total range of key values for the secondary index partitioning key and a number of available partitions in the storage system; and distributing the records stored by the one or more storage devices to the available partitions in the one or more storage devices based on the number of records in each sub-range while keeping records having a same secondary index partitioning key in a least number of partitions.

7. The system of claim 6, wherein initializing the plurality of counters comprises determining a number of counters in the plurality of counters by determining the distribution of the secondary index partitioning key after scanning the table of records.

8. The system of claim 6, wherein accumulating the count of the number of records in each sub-range is based on a number of occurrences of records associated with the secondary index partitioning key which matches that sub-range.

9. The system of claim 6, wherein accumulating, in each counter of the plurality of counters, the count of the number of records in the associated sub-range is performed in parallel processes and the total number of records in the total range of key values for the secondary index partitioning key comprises a sum of the number of records in each sub-range, accumulated in all parallel processes.

10. The system of claim 6, wherein distributing the records stored by the storage system to the available partitions in the storage system based on the number of records in each sub-range while keeping records having a same secondary index partitioning key in a least number of partitions comprises arranging the sub-ranges in a sorted order, combining records of adjacent sub-ranges in one partition of the available partitions if the sum of the number of records in the combined adjacent sub-ranges is less than or equal to a target record count for each partition and splitting records of a sub-range between two or more partitions of the available partitions if the number of records in that sub-range exceeds the target file count for each partition.

11. A non-transitory, computer-readable memory comprising a set of instructions stored therein which, when executed by a processor, causes the processor to distribute records among storage partitions in the one or more storage devices based on range-partitioned indexes by:

maintaining a table of a plurality of records indexed based on a plurality of original partitioning keys in the table of records, wherein each original partitioning key comprises an identifier uniquely identifying a record of the plurality of records and an owner of the record, wherein the storage system comprises a multi-tenant storage system, wherein the records comprise records associated with a plurality of tenants, and wherein the owner of each record comprises one of a plurality of users associated with one of the plurality of tenants;

initializing a plurality of counters, each counter of the plurality of counters associated with a sub-range of a plurality of sub-ranges in a total range of key values for a secondary index partitioning key, wherein the secondary index partition key comprises a foreign key uniquely identifying an association between owners of two or more records of the plurality of records, wherein the association between records uniquely identified by the secondary index partition key comprises an identification of the association between the owner of each record and one of the plurality of tenant, and wherein a sub-range for each record is identified by a pre-determined number of first bits of the secondary index partition key and the number of sub-ranges is based on a range of values represented by the pre-determined number of first bits of the secondary index partition key;

reading each record of the table of records;

accumulating in each counter of the plurality of counters, a count of a number of records in the associated sub-range based on the pre-determined number of first bits of the secondary index partition key for each of the records associated with any secondary keys falling in the relevant sub-range;

determining a number of records per partition based on a total number of records in the total range of key values for the secondary index partitioning key and a number of available partitions in the storage system; and distributing the records stored by the one or more storage devices to the available partitions in the one or more storage devices based on the number of records in each sub-range while keeping records having a same secondary index partitioning key in a least number of partitions.

12. The non-transitory, computer-readable medium of claim 11, wherein initializing the plurality of counters comprises determining a number of counters in the plurality of counters by determining the distribution of the secondary index partitioning key after scanning the table of records.

13. The non-transitory, computer-readable medium of claim 11, wherein accumulating the count of the number of records in each sub-range is based on a number of occurrences of records associated with the secondary index partitioning key which matches that sub-range.

14. The non-transitory, computer-readable medium of claim 11, wherein accumulating, in each counter of the plurality of counters, the count of the number of records in the associated sub-range is performed in parallel processes on disjoint subsets of the records and the total number of records in the total range of key values for the secondary index partitioning key comprises a sum of the number of records in each sub-range, across all disjoint subsets of records.

15. The non-transitory, computer-readable medium of claim 11, wherein distributing the records stored by the storage system to the available partitions in the storage system based on the number of records in each sub-range while keeping records having a same secondary index partitioning key in a least number of partitions comprises arranging the sub-ranges in a sorted order, combining records of adjacent sub-ranges in one partition of the available partitions if the sum of the number of records in the combined adjacent sub-ranges is less than or equal to a target file count for each partition and splitting records of a sub-range between two or more partitions of the available partitions if the number of records in that sub-range exceeds the target file count for each partition.

\* \* \* \* \*